US008073876B2

(12) United States Patent
Sumizawa et al.

(10) Patent No.: US 8,073,876 B2
(45) Date of Patent: Dec. 6, 2011

(54) COMPUTER PRODUCT HAVING DISTRIBUTION MAP DATA, DISTRIBUTION MAP DATA GENERATING METHOD, DISTRUBUTION MAP DATA GENERATING APPARATUS AND TERMINAL DEVICE

(75) Inventors: Akio Sumizawa, Zama (JP); Yoshinori Endo, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 795 days.

(21) Appl. No.: 10/529,541

(22) PCT Filed: Sep. 29, 2003

(86) PCT No.: PCT/JP03/12392
§ 371 (c)(1),
(2), (4) Date: Jan. 13, 2006

(87) PCT Pub. No.: WO2004/032096
PCT Pub. Date: Apr. 15, 2004

(65) Prior Publication Data
US 2006/0155462 A1     Jul. 13, 2006

(30) Foreign Application Priority Data

Sep. 30, 2002  (JP) ................................. 2002-287658

(51) Int. Cl.
*G06F 7/00*      (2006.01)
*G06F 17/30*     (2006.01)
*G01C 21/30*     (2006.01)
*G01C 21/32*     (2006.01)
*G09G 5/00*      (2006.01)
*G01C 21/00*     (2006.01)

(52) U.S. Cl. ........ 707/803; 345/619; 701/201; 701/208; 701/209

(58) Field of Classification Search ................... 707/102, 707/104.1, 803, 999.102, 999.104; 701/201, 701/208, 209; 705/7; 345/440, 619; 340/988–996
See application file for complete search history.

(56) References Cited

U.S. PATENT DOCUMENTS

| | | | |
|---|---|---|---|
| 6,067,499 A | | 5/2000 | Yagyu et al. |
| 6,320,518 B2 * | | 11/2001 | Saeki et al. ............. 340/995.12 |
| 6,559,865 B1 * | | 5/2003 | Angwin ........................ 715/765 |
| 6,564,224 B1 * | | 5/2003 | Wu et al. .................... 707/104.1 |
| 6,658,351 B2 * | | 12/2003 | Seto et al. ...................... 701/208 |
| 7,308,117 B2 * | | 12/2007 | Chitradon et al. ............ 382/113 |
| 7,639,163 B2 * | | 12/2009 | Tran ........................ 340/995.19 |

(Continued)

FOREIGN PATENT DOCUMENTS

EP     1 134 674 A1     9/2001

(Continued)

OTHER PUBLICATIONS

European Search Report (Three (3) pages) dated Dec. 30, 2005.

*Primary Examiner* — James Trujillo
*Assistant Examiner* — Cheryl M Shechtman
(74) *Attorney, Agent, or Firm* — Crowell & Moring LLP

(57) ABSTRACT

Distribution map data for distributing a map by communication includes road data representing position information on the roads contained in a plurality of compartments and integrating name data for integrating name information for the same roads contained in the plurality of compartments without duplicating them.

19 Claims, 9 Drawing Sheets

U.S. PATENT DOCUMENTS

| | | |
|---|---|---|
| 2002/0065691 A1 | 5/2002 | Twig et al. |
| 2002/0091758 A1* | 7/2002 | Singh et al. ............... 709/203 |
| 2004/0117109 A1* | 6/2004 | Kodani et al. ............ 701/200 |

FOREIGN PATENT DOCUMENTS

| | | |
|---|---|---|
| JP | 07-182493 | 7/1995 |
| JP | 8-63575 A | 3/1996 |
| JP | 10-171347 A | 6/1998 |
| JP | 2000-029450 | 1/2000 |
| JP | 2000-284685 A | 10/2000 |
| JP | 2001-215128 A | 8/2001 |
| JP | 2002-042297 | 2/2002 |
| JP | 2002-99207 A | 4/2002 |
| JP | 2003-016469 | 1/2003 |

* cited by examiner

FIG.5
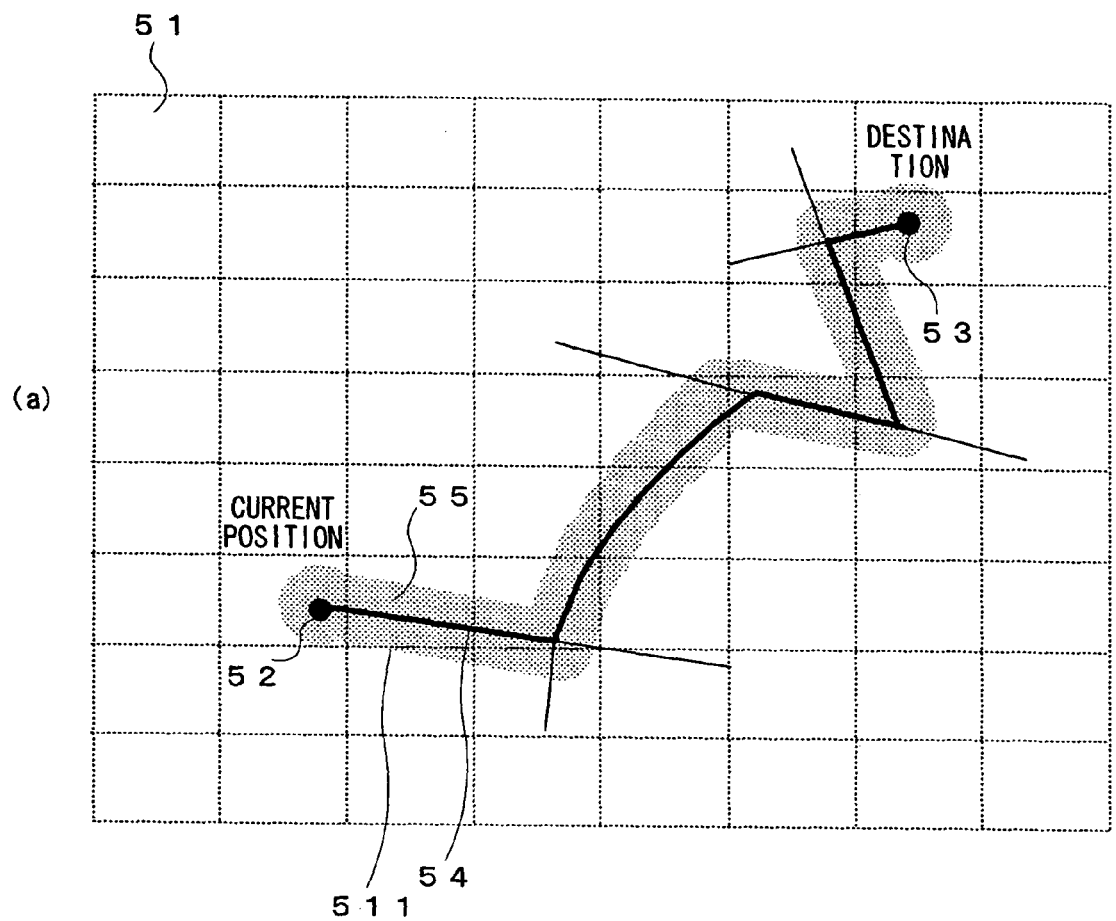
(a)
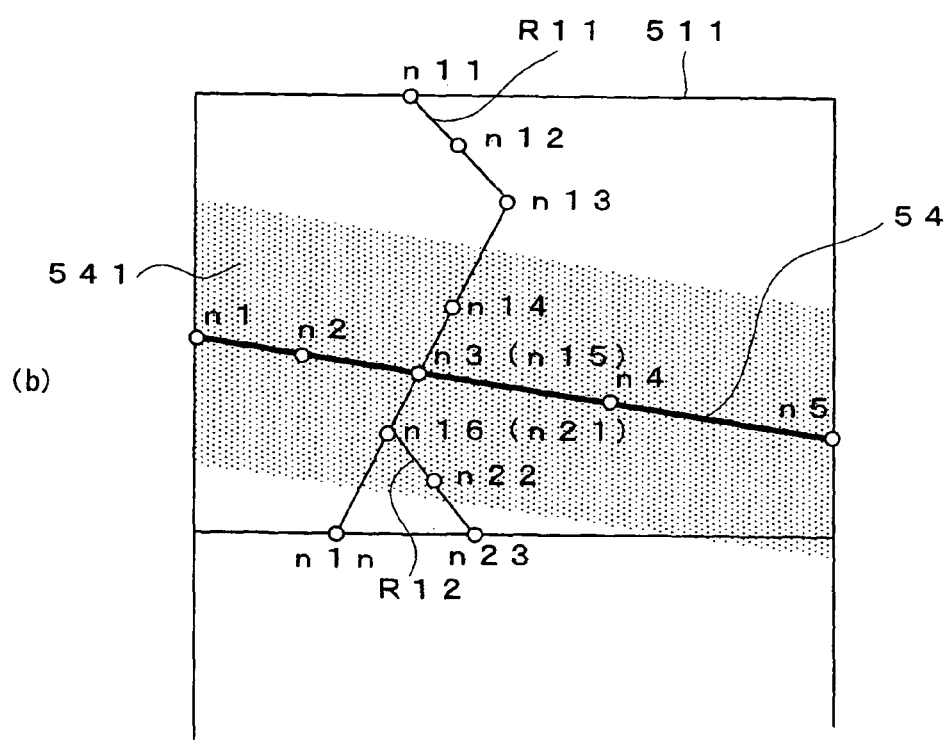
(b)

COMPUTER PRODUCT HAVING DISTRIBUTION MAP DATA, DISTRIBUTION MAP DATA GENERATING METHOD, DISTRUBUTION MAP DATA GENERATING APPARATUS AND TERMINAL DEVICE

INCORPORATION BY REFERENCE

The disclosure of the following priority application is herein incorporated by reference:

Japanese Patent Application No. 2002-287658 filed Sep. 30, 2002

TECHNICAL FIELD

The present invention relates to map data used to display a map at an information terminal such as a navigation system installed in a vehicle, and more specifically, it relates to a technology to reduce the data volume of distribution map data distributed through wireless communication by using a portable telephone or the like.

BACKGROUND ART

Map data used in the related art in a navigation system installed in a vehicle are compiled in information units (layers) each defined in correspondence to a specific map scaling factor, with each layer of data containing information divided in units (meshes) matching a predetermined area range. Road data indicating road shapes, road types and the like, background data indicating the shapes and types of background objects other than roads and name data indicating the names of the roads and the background objects in the road data and the background data are provided in correspondence to each match.

DISCLOSURE OF THE INVENTION

Even when a plurality of meshes or a plurality of layers share common name data, the name data are provided in correspondence to each mesh or each layer in the map data in the related art. For this reason, the volumes of transmitted data are bound to be large, requiring great lengths of communication time and great communication costs in a communication navigation system in which such map data are transmitted from the distribution center to individual terminals to indicate recommended routes in response to route search requests.

The present invention achieves a reduction in the data volume of distribution map data used to distribute a map through communication by providing common name data for individual area blocks and individual layers.

In the computer product having stored therein distribution map data used to distribute a map through communication according to the present invention, the distribution map data include road data containing position information indicating positions of roads each extending over a plurality of area blocks and integrated name data including integrated name information for each road contained over a plurality of area blocks instead of redundant name information for the road in correspondence to the individual area blocks.

The distribution map data generating method for generating distribution map data used to distribute a map through communication according to the present invention comprises steps for extracting road data and background data corresponding to a route contained in a plurality of specified area blocks from road map data achieved by dividing into a plurality of area blocks road data containing road position information and background data containing road name information, generating integrated name data containing integrated name information in correspondence to each set of common road data contained in the plurality of area blocks having been extracted without an overlap and generating the distribution map data by using the extracted road data and the integrated name data.

The distribution map data generating apparatus that generates distribution map data used to distribute a map through communication according to the present invention comprises a storage means for storing road map data achieved by dividing into a plurality of area blocks road data containing road position information and background data containing road name information, an extraction means for extracting road data and background data corresponding to a predetermined route extending over a plurality of area blocks based upon the road map data, an integrating means for integrating name information corresponding to each set of common road data contained in the plurality of area blocks having been extracted as integrated name data without an overlap and a generating means for generating the distribution map data by using the extracted road data and the integrated name data.

The terminal device according to the present invention that displays a map based upon distribution map data generated by the distribution map data generating apparatus described above comprises a reception means for receiving the distribution map data transmitted from an external source and a display means for displaying at least part of a route on a monitor based upon road data in the received distribution map data with a name of a road on the route attached to the road on display based upon integrated name data in the received distribution map data.

It is desirable that the terminal device further comprise a position determining means for determining a display position for the integrated name data on the display screen.

According to the present invention, the route mentioned above may be determined based upon the road data as a road from a start point to an end point. The distribution map data may be provided as a plurality of layers of data, each containing road data in correspondence to a specific scaling factor. In such a case, it is desirable to provide integrated name data including integrated name information for each set of common road data contained over a plurality of layers instead of providing redundant name information in correspondence to the individual layers. In addition, when extracting the road data and the background data corresponding to the route extending over the plurality of specified area blocks, road data and background data contained in an area ranging over a predetermined width along the route may be extracted based upon the road map data.

BRIEF DESCRIPTION OF THE DRAWINGS

FIG. 5 illustrates the method adopted to slice out a map over a specific range along the route;

BEST MODE FOR CARRYING OUT THE INVENTION

Figure 1:
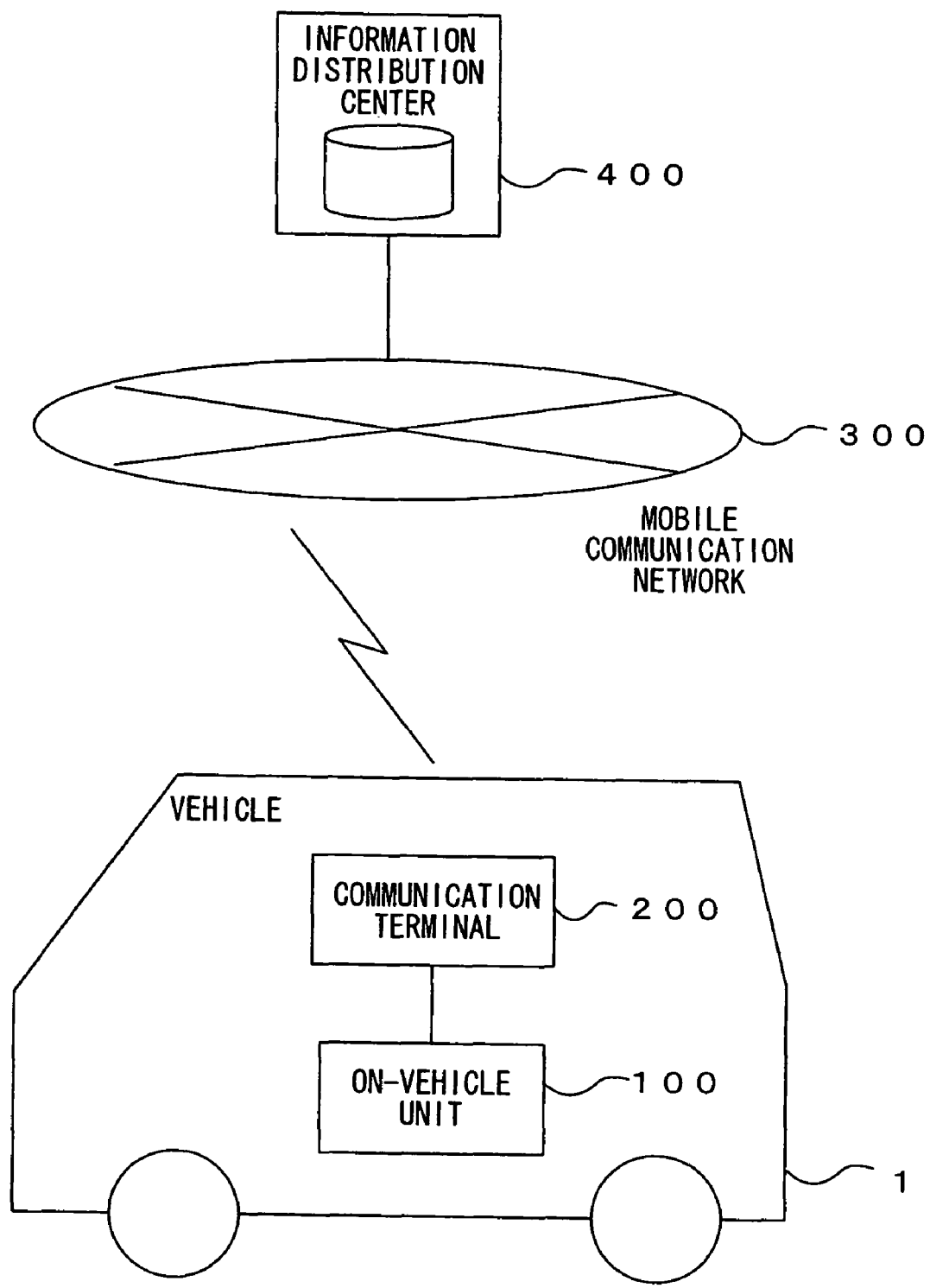
FIG. 1 is a block diagram of the structure adopted in the map information distribution system.

An embodiment achieved by adopting the present invention in a map information distribution system through which map information is distributed to car navigation systems is explained in reference to FIG. 1. A car navigation system (hereafter referred to as an on-vehicle unit) 100 installed in a vehicle 1 is connected with a communication terminal 200 through a communication cable. The communication terminal 200 is connected through radio waves with an information distribution center 400 via a mobile communication network 300. In response to various requests issued from the on-vehicle unit 100 and transmitted via the communication terminal 200, the information distribution center 400 provides the on-vehicle unit 100 with various types of information such as map data. The communication terminal 200 may be, for instance, a portable telephone.

Figure 2:
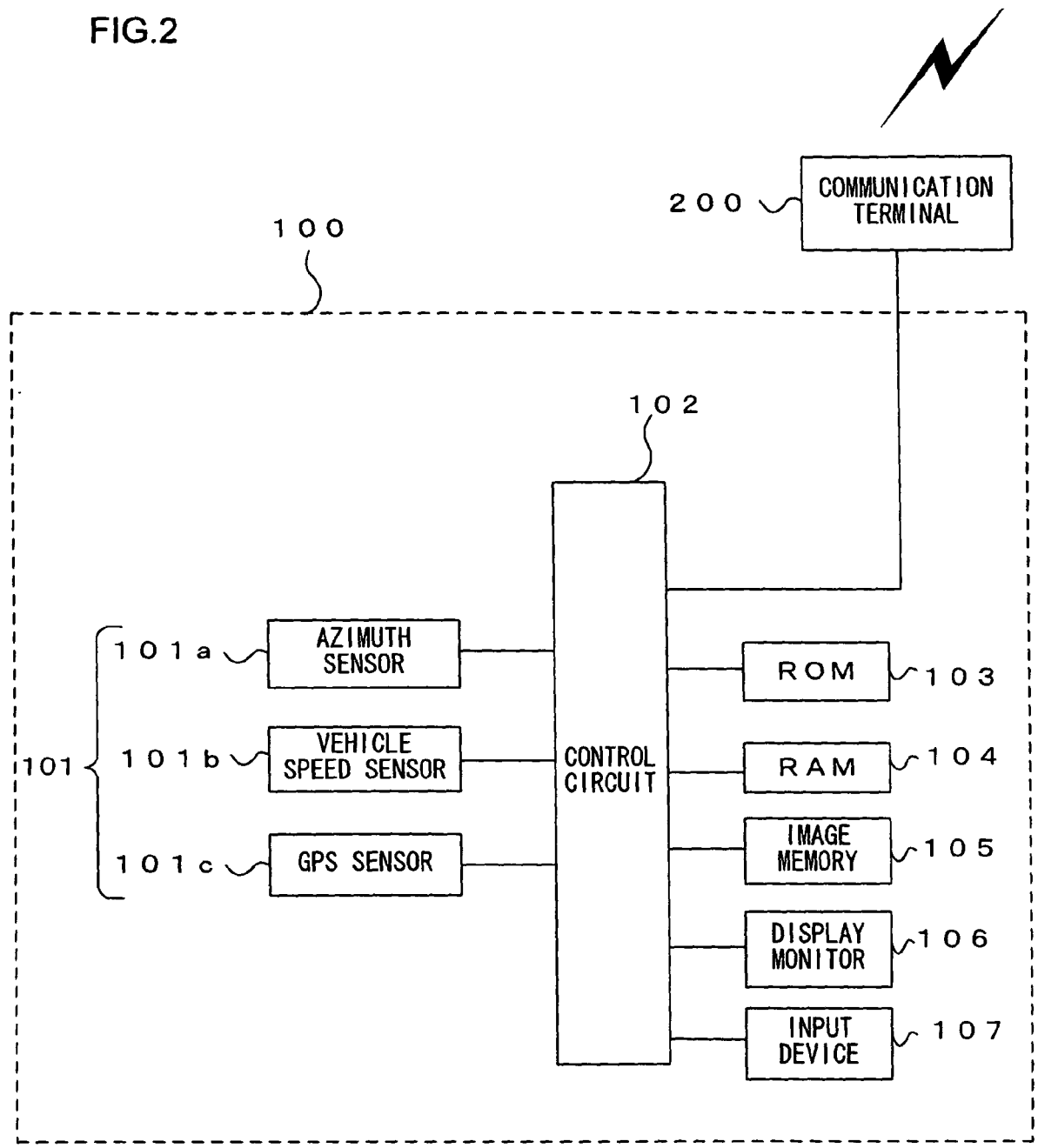
FIG. 2 is a block diagram of the structure adopted in the on-vehicle unit in the map information distribution system.

FIG. 2 is a system block diagram showing the structure adopted in the on-vehicle unit 100. A current position detection device 101 that detects the current position of the vehicle may be constituted with, for instance, an azimuth sensor 101a that detects the advancing azimuth of the vehicle, a vehicle speed sensor 101b that detects the vehicle speed, a GPS sensor 101c that detects a GPS signal transmitted from a GPS satellite and the like. A control circuit 102 constituted with a microprocessor and its peripheral circuits, uses a RAM 104 as a work area when executing a control program stored in a ROM 103 to implement various types of control.

Image data used to display images at a display monitor 106 are stored in an image memory 105. The image data include road map drawing data and various types of graphic data, and based upon map data transmitted from the information distribution center 400 in FIG. 1, map information is displayed at the display monitor 106. An input device 107 includes various switches through which a destination for the vehicle and the like are input. The communication terminal 200 exchanges various types of communication data with the control circuit 102, and is also connected through radio waves with the information distribution center 400 via the mobile communication network 300.

Figure 3:
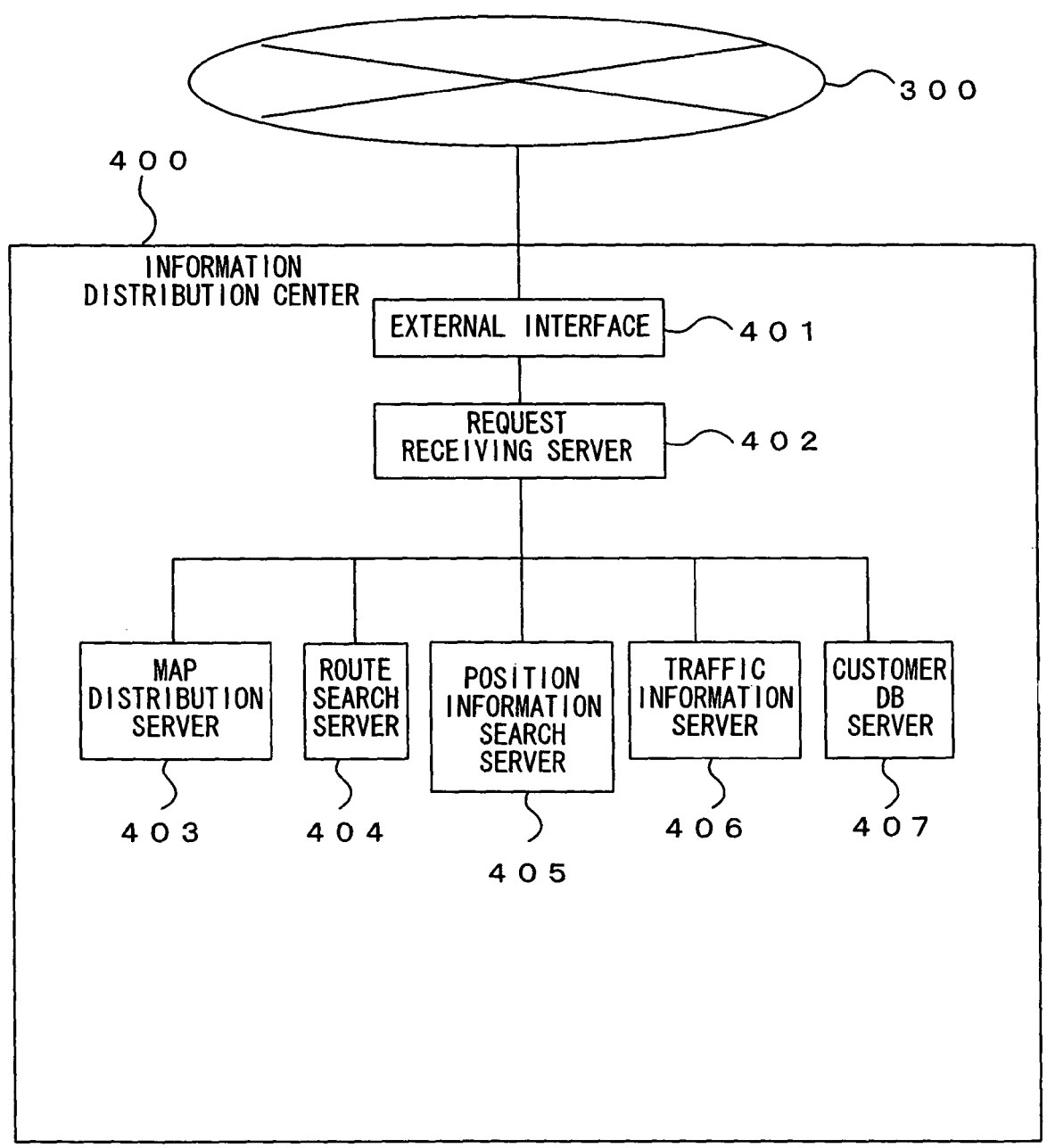
FIG. 3 is a block diagram of the structure adopted in the information distribution center in the map information distribution system.

FIG. 3 is a system block diagram showing the structure of the information distribution center 400. The information distribution center 400 is connected with the mobile communication network 300 via an external interface 401. A request receiving server 402 receives requests such as a route search request arriving via the external interface 401 and issues a route search request, a map request and the like for various servers to be detailed later to execute the appropriate processing. In addition, the request receiving server outputs the results of the processing output from the individual servers to the external interface 401.

At a map distribution server 403, map data are stored in a storage medium such as a hard disk. In response to a map request from the request receiving server 402, it searches for the matching map data from the map data stored therein and outputs the map data obtained through the search to the request receiving server 402. In response to a route search request from the request receiving server 402, a route search server 404 searches for the matching route by using position information and a traffic information database respectively provided by a position information search server 405 and a traffic information server 406 and outputs the results of the route search. The position information search server 405 conducts a search of facilities in the vicinity of the current position. The traffic information server 406 holds a database containing traffic information including a history of traffic congestion. A customer DB server 407 holds customer personal data related to the customer who owns the on-vehicle unit 100 and also updates the personal data based upon the utilization status indicating the customer's utilization of the information distribution center 400. The personal information may include, for instance, account information.

Figure 4:
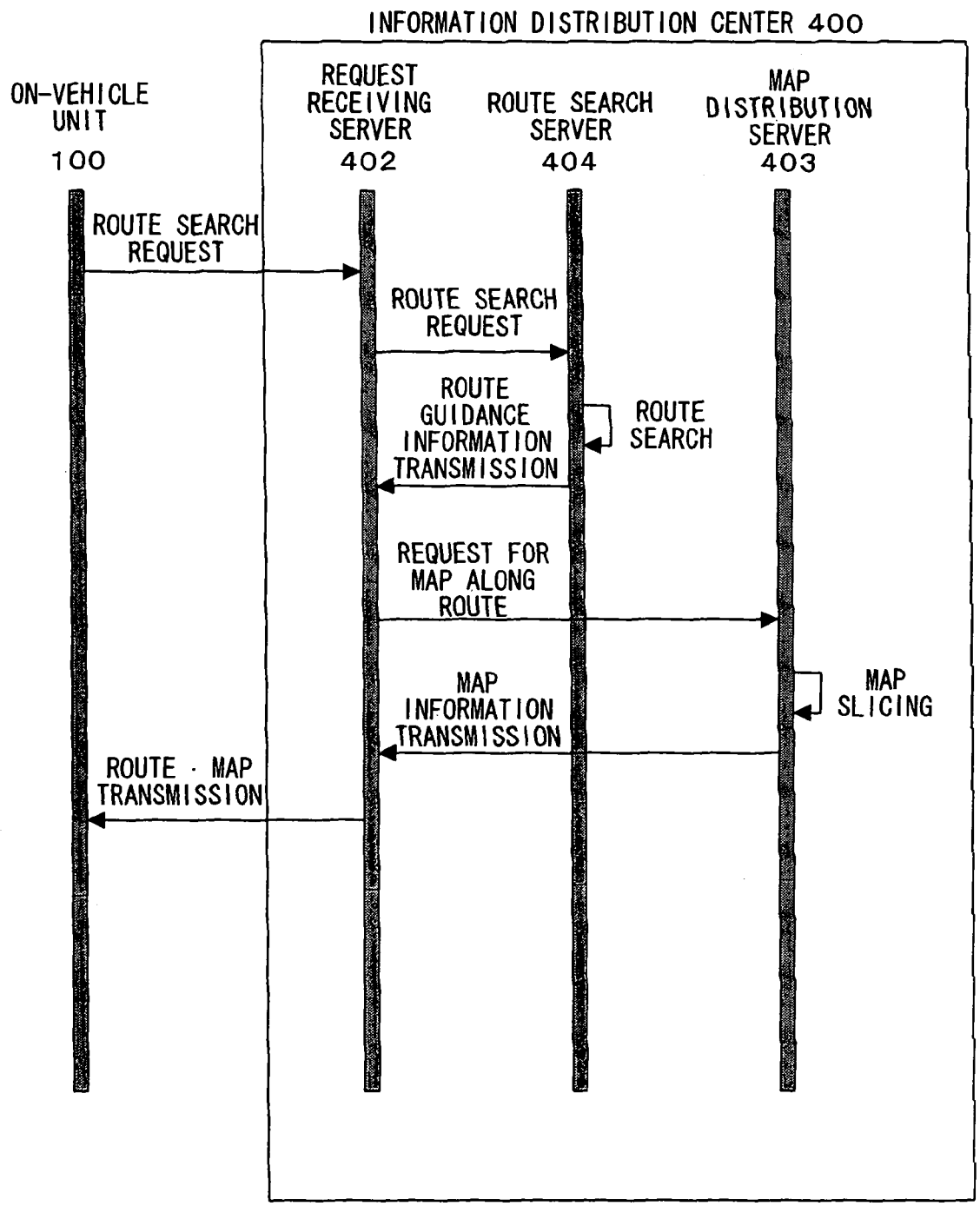
FIG. 4 shows how data flow when a route search request is issued.

FIG. 4 shows how data flow when a route search request is issued. As a destination is entered through the input device 107, the on-vehicle unit 100 issues a route search request. The route search request generated at the on-vehicle unit 100 is transmitted to the information distribution center 400 via the communication terminal 200 and the mobile communication network 300. The route search request received at the information distribution center 400 first passes through the external interface 401 and is then input to the request receiving server 402 where its contents are recognized. The request receiving server 402 then issues a route search request to the route search server 404. Based upon the position information and the traffic information respectively provided by the position information search server and the traffic information server 406, the route search server 404 executes a route search and transmits route guidance information to the request receiving server 402. Upon receiving the route guidance information from the route search server 404, the request receiving server 402 outputs a request for a map corresponding to the route to the map distribution server 403. The map distribution server 403 extracts map information by a slicing out data over a specific range along the route from the map data stored therein through the method to be detailed later and provides the map information to the request receiving server 402.

The request receiving server 402 then outputs the route guidance information and the map information having been obtained as described above to the external interface 401. The output data are transmitted to the on-vehicle unit 100 via the mobile communication network 300 and the communication terminal 200. The transmitted information is provided to the user as an image displayed at the on-vehicle unit 100. The sequence of route search processing is thus completed.

FIG. 5 shows the method adopted to slice out a map over a specific range along the route having been set. As the destination is set at the on-vehicle unit 100, the route search server 404 sets a current position 52 and a destination 53, and a recommended route 54 connecting the current position and the destination is set through route search calculation processing of the known art. A slicing range 55 along the route is set over a specific range containing the route 54, such as the shaded range in the figure. In addition, around the current position 52 and the destination 53, ranges greater than the range set along the rest of the route are set. The map data contained within the slicing range 55 are extracted in units of individual meshes 51 defined by dividing the map into specific area ranges of equal size and are transmitted as map data from the information distribution center 400 to the on-vehicle unit 100.

Figure 6:
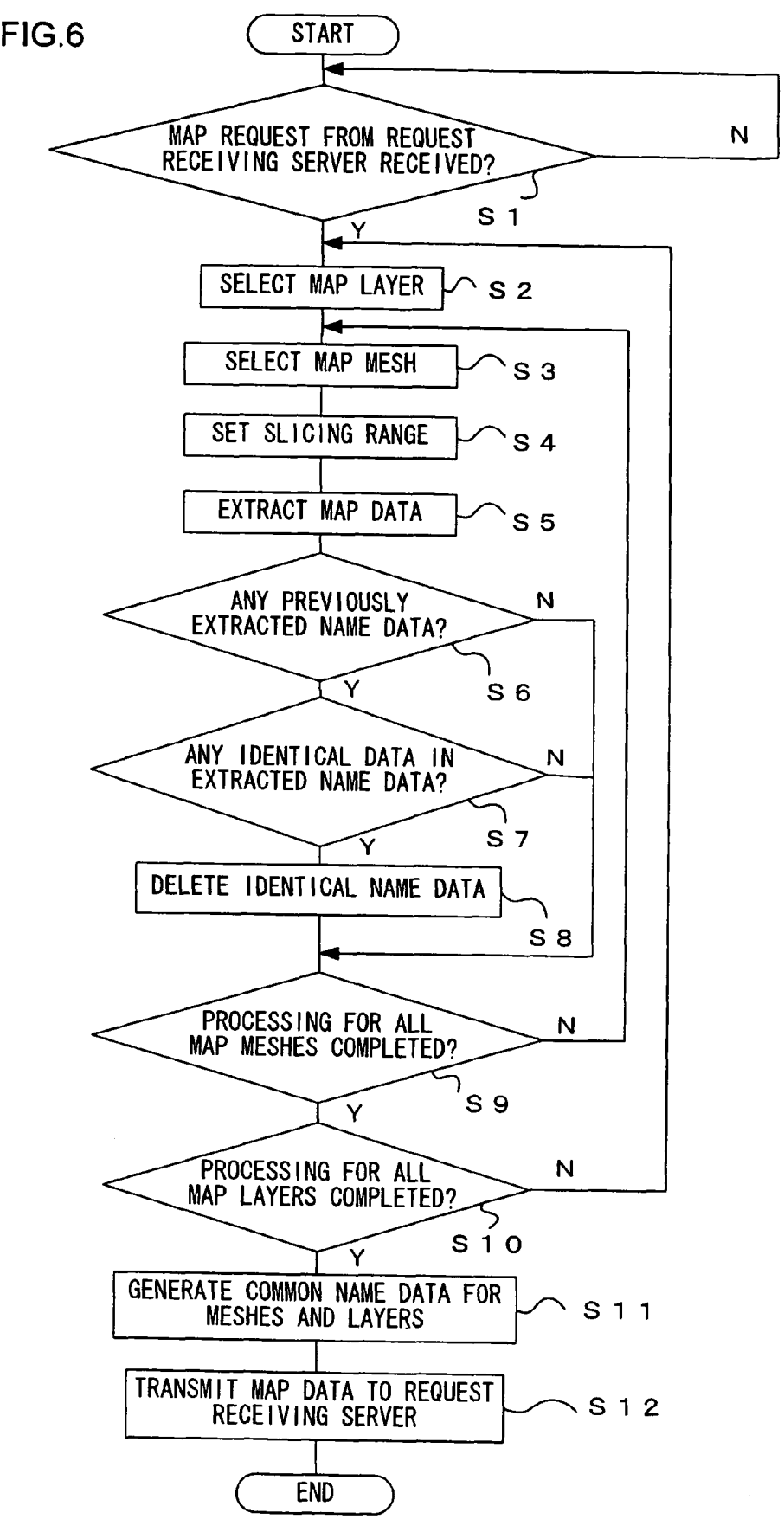
FIG. 6 presents a flowchart of the processing executed to integrate the name data when slicing out map data.

FIG. 6 shows the flow of the control implemented when generating distribution map data. This control flow, which is the flow of the processing executed based upon a program executed by the map distribution server 403, is executed at all times. In step S1, a decision is made as to whether or not a map request from the request receiving server 402 has been received. The operation proceeds to the following step S2 if a map request has been received, whereas the processing in step S1 is repeatedly executed if no map request has been received. In step S2, a map layer is selected. The term "map layer" in this context refers to a layer in the map data assuming a hierarchical structure in which each map data layer is defined in correspondence to a specific scaling factor.

In step S3, a map mesh is selected. The term "map mesh" in this context refers to a block of map data obtained by dividing the map data in the particular map layer into area blocks ranging over areas, the sizes of which are equal to one another. In step S4, the slicing range in the selected mesh is set. In step S5, the map data within the slicing range are extracted. The processing executed in steps S3 through S5 is described in detail below.

Through the processing executed in step S3, all the meshes through which the recommended route extends from the current position to the destination are extracted and one of the extracted meshes is selected. When the processing in step S3 is executed for the first time in the control flow shown in FIG. 6, the mesh containing the current position is selected as the first mesh. The next time step S3 is executed, a mesh adjacent to the mesh containing the current position, through which the recommended route passes or in the vicinity of which the recommended route extends, is selected as the second mesh, and when step S3 is executed subsequently, a mesh adjacent to the second mesh, through which the recommended route passes, it is selected as the third mesh. Finally, the mesh containing the destination is selected as an nth mesh.

In step S4, the slicing range for map data extraction is set within the selected mesh. As the first mesh containing the current position is selected, a current position surrounding area ranging over, for instance, a radius of 250 m around the current position is specified and is set as the slicing range. If this current position surrounding area ranges into an adjacent mesh, the area contained in the adjacent mesh, too, is set as part of the current position surrounding area slicing range.

In addition, the recommended route extending beyond the current position surrounding area within the mesh containing the current position is specified. Then, an area along the recommended route ranging over, for instance, 500 m in width around the recommended route is specified and is set as the slicing range. If the recommended route is not present in the mesh beyond the current position surrounding area, such a slicing range along the route is not set.

If the second mesh adjacent to the mesh containing the current position, through which the recommended route passes, is set in step S3, an area along the route ranging over, for instance, 500 m in width around the route passing through the second mesh is specified and is set as the slicing range in step S4.

If the nth mesh containing the destination is selected in step S3, a destination surrounding area ranging over a radius of 250 m, for instance, around the destination is specified and is set as the slicing range in step S4. If the destination surrounding area ranges into an adjacent mesh, the area contained in the adjacent mesh, too, is set as part of the destination surrounding area slicing range. In addition, the recommended route extending beyond the destination surrounding area within the mesh containing the destination is specified. Then, an area along the recommended route ranging over, for instance, 500 m in width around the recommended route is specified and is set as the slicing range. If the recommended route is not present in the mesh beyond the destination surrounding area, such a slicing range along the route is not set.

In step S5, the map data contained in the slicing range having been set in step S4 are extracted. The road data are constituted as link string data connecting a start point node and an end point node with a plurality of nodes. Each-node is indicated with coordinate values. Accordingly, map data containing node information of all nodes assigned with specific coordinate values within the area having been set as the slicing range are extracted.

The data extraction processing described above is executed in all the meshes, starting with the mesh containing the current position and ending with the mesh containing the destination, thereby extracting all the map data in the route surrounding area within the specific range along the route from the current position to the destination.

FIG. 5(*b*) is an enlargement of a mesh 511 in FIG. 5(*a*). In a route surrounding area 541 ranging over, for instance, 500 m in width around the route 54 in the mesh 511, a link string R11 that includes nodes n11 through n17 and a link string R12 that includes nodes n21 through n23 are present. The nodes n14, n15, n16, n21 and n22 contained in the route surrounding area 541 among the nodes in the link strings R11 and R12 are extracted. No map data are extracted in correspondence to the nodes n11 to n13, n17 and n23 since they are outside the slicing range. It is to be noted that map data containing the node information of all the nodes present in an adjacent-mesh into which the route surrounding area ranges are also extracted even if the recommended route 54 does not pass through the adjacent mesh.

In step S6, a decision is made as to whether or not there are any name data having been previously extracted in step S5 prior to the name data extraction executed in the most recent step S5. The operation proceeds to the following step S7 if there are such name data, whereas the operation proceeds to step S9 if no name data were extracted previously.

In step S7, a decision is made as to whether or not the name data most recently extracted in step S5 include name data identical to the name data having been extracted through the processing previously executed in step S5. If identical name data are included, the operation proceeds to step S8, whereas the operation proceeds to step S9 if no identical name data are included. In step S8, the name data identical to the name data having been extracted through the processing previously executed in step S5 are deleted from the name data most recently extracted in step S5. As a result, the same name data are not provided redundantly.

In step S9, a decision is made as to whether or not the map data extraction in steps S3 through S8 has been completed for all the map meshes selected along the route having been set in the selected map layer. If the extraction processing has been completed for all the map meshes, the operation proceeds to the following step S10. If the processing has not been completed yet, the operation returns to step S3 to select another map mesh for the map data extraction. In step S10, a decision is made as to whether or not the map data extraction in steps S2 through S9 has been completed with regard to all the map layers. If the extraction processing for all the map layers has been completed, the operation proceeds to the following step S11. If, on the other hand, the processing has not been completed yet, the operation returns to step S2 to select another map layer for the map data extraction. Once the map data are extracted in correspondence to all the map layers and all the map meshes as described above, common name data to be shared among the individual meshes and layers are prepared based upon the name data included in the extracted map data in step S11. Then, the map data containing the common name data thus generated are transmitted to the request receiving server 402 in step S12. As the explanation above clearly indicates, the request receiving server 402, the map distribution server 403 and the route search server 404 together constitute the distribution map data generating apparatus.

Figure 7:
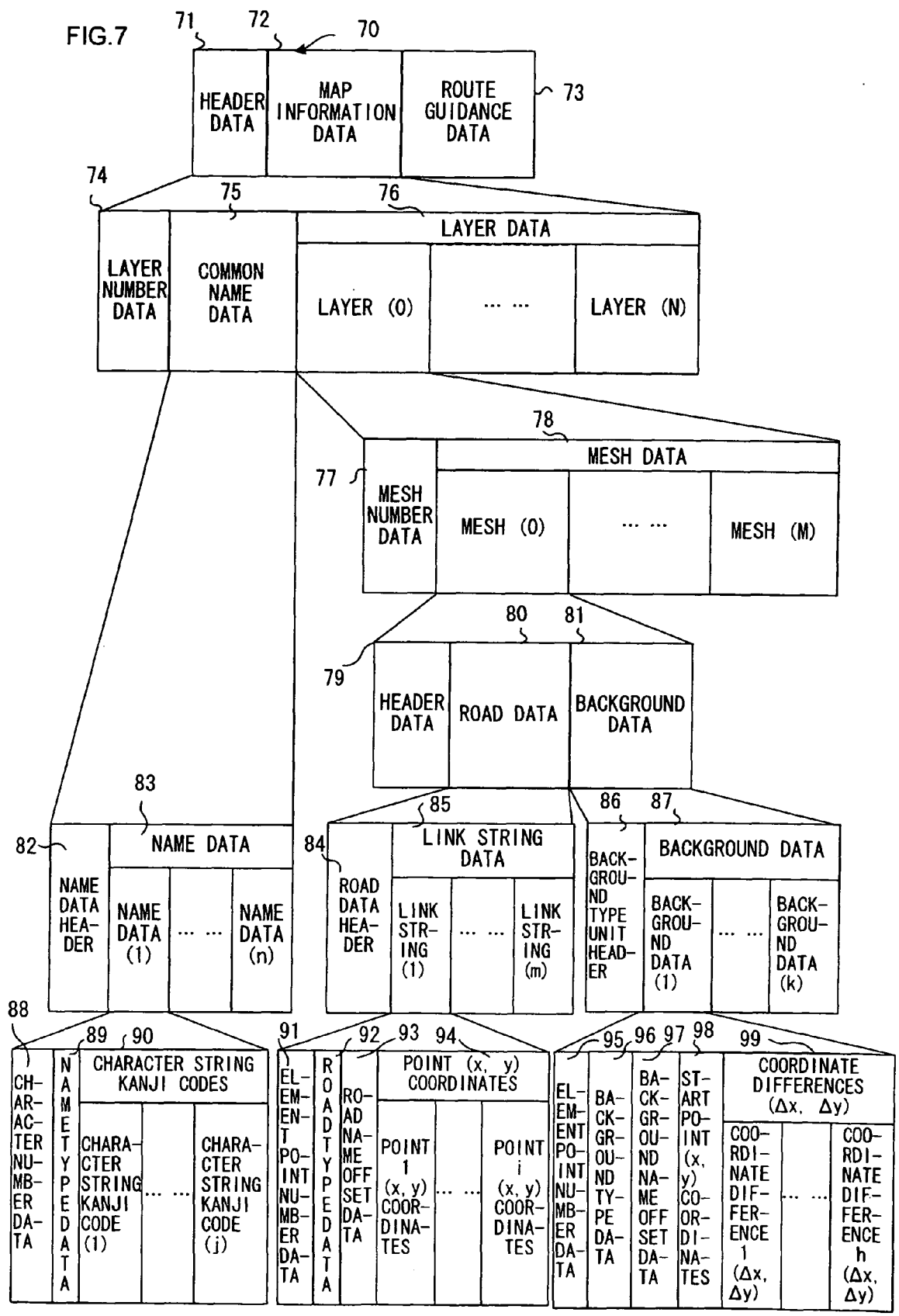
FIG. 7 presents an example of a structure that may be adopted in the map data for transmission.

An example of a structure of the map data transmitted, to the on-vehicle unit 100 as the search results may assume is presented in FIG. 7. Map data 70 are constituted with header data 71, map information data 72 and route guidance data 73. The header data 71 include various types of management data. The map information data 72 include various types of data to be detailed later. The route guidance data 73 are constituted with data that include name data and shape data with regard to guidance points such as intersections and buildings set on the searched route or right/left turn data.

The map information data 72 are constituted with layer number data 74 indicating the number of layers, common name data 75 and layer data 76. The layer data 76 are constituted with data contained in layers (0) through (N). The layers (0) through (N) are defined as map data assuming scaling factors different from one another. The layer number data 74 indicate the number of layers (N+1 layers in this example). The common name data 75 indicate the names of roads and background objects and are used commonly among the individual layers and the individual meshes as detailed later. Namely, by using a single set of name data for a road or a given background object along the recommended route, i.e., by using common name data among the individual layers and the individual meshes, the data volume can be reduced.

In the layer data 76, for instance, the data of the layer (0) are constituted with mesh number data 77 indicating the number of meshes and mesh data 78. Each data of the other layers are constituted with similar data. The mesh data 78 are constituted with data contained in meshes (0) through (M) The meshes (0) through (M) are defined as areas obtained by dividing the map assuming the scaling factor defining the layer (0) into specific equal range blocks. The mesh number data 77 indicate the number of meshes (M+1 meshes in this example).

In the mesh data 78, for instance, the data of the mesh (0) are constituted with header data 79, road data 80 and background data 81. The data of the other meshes assume a similar structure. The header data 79 include various types of management data. The road data 80 and the background data 81 assume data structures detailed below.

The road data 80 are constituted with a road data header 84 and link string data 85. The road data header 84 includes data indicating the number of link strings (m link strings in this example), for instance. The sets of link string data 85 are each constituted with data corresponding to one of link strings (1) through (m) (when there are m link strings).

In the link string data 85, for instance, the data corresponding to the link string (1) are constituted with element point number data 91, road type data 92, road name offset data 93 and point (x, y) coordinate data 94. The element point number data 91 indicate the number of element points (i points in this example) indicated by the point (x, y) coordinates 94. The road type data 92 indicate the type of road represented by the link string (1), e.g., a national road or a prefectural road. The road name offset data 93 specify the name data that indicate the name of the road represented by the link string (1) by using the address of the name data 83 in the map data. Point (x, y) coordinates 94 indicate the (x, y) coordinates of the element points 1 through i (when there are i element points) on the map.

The background data 81 are constituted with a background type unit header 86 and background data 87. The background type unit header 86 includes various data, for instance, the data indicating the number of sets of background data (k sets in this example). The background data 87 are constituted with background data (1) through (k) (when there are k sets of background data).

In the background data 87, for instance, the background data (1) are constituted with element point number data 95, background type data 96, background name offset data 97, start point (x, y) coordinate data 98 and coordinate difference data ($\Delta x$, $\Delta y$) 99. The element point number data 95 indicate the number of element points (h+1 points in this example) each indicated by the start point (x, y) coordinates 98 and a coordinate difference ($\Delta x$, $\Delta y$) 99. The background type data 96 indicate the type of background object corresponding to the background data 1, e.g., a railway, a river or a lake. The background-name offset data 97 specify the name data indicating the name of the background object corresponding to the background data 1 by using the address of the name data 83 in the map data. The start point (x, y) coordinate data indicate the coordinates of a start point selected from the element points on the map. Coordinate difference data ($\Delta x$, $\Delta y$) 99 indicate the coordinates of the element points 1 through h (when there are h element points) on the map as the difference of each element points relative to the start point (x, y) coordinates 98.

The common name data 75 are constituted with a name data header 82 and name data 83. The name data header 83 includes data indicating the total number of sets of the name data (n sets in this example). Name data 83 are constituted with name data (1) through (n) (when there are n sets of name data) Each set of name data 83 indicates the name of the road represented by the corresponding link string in the road data 80 or the name of the background object expressed with the corresponding set of background data in the background data 81.

In the data of the name data 83, for instance, the name data (1) are constituted with character number data 88, name type data 89 and character string Kanji codes 90. The character number data 88 include data indicating the number of characters in the name data (1), i.e., the total number of character string Kanji codes (j codes in this example). The name type data 89 indicate the type of the name expressed with the name data (1), e.g., a road or a railway. The character string Kanji codes 90 are constituted with sets of data each corresponding to one of character string Kanji codes (1) through (j) (when there are j codes) indicating the characters used for display at the display monitor 106.

It is to be noted that the nationwide map data stored in the map distribution server 403 do not include the common name data shown in FIG. 7. The distribution map data in FIG. 7 are prepared as the map along the recommended route extending from the current position to the destination is sliced out based upon the nationwide map database, in response to a route search-request.

Figure 8:
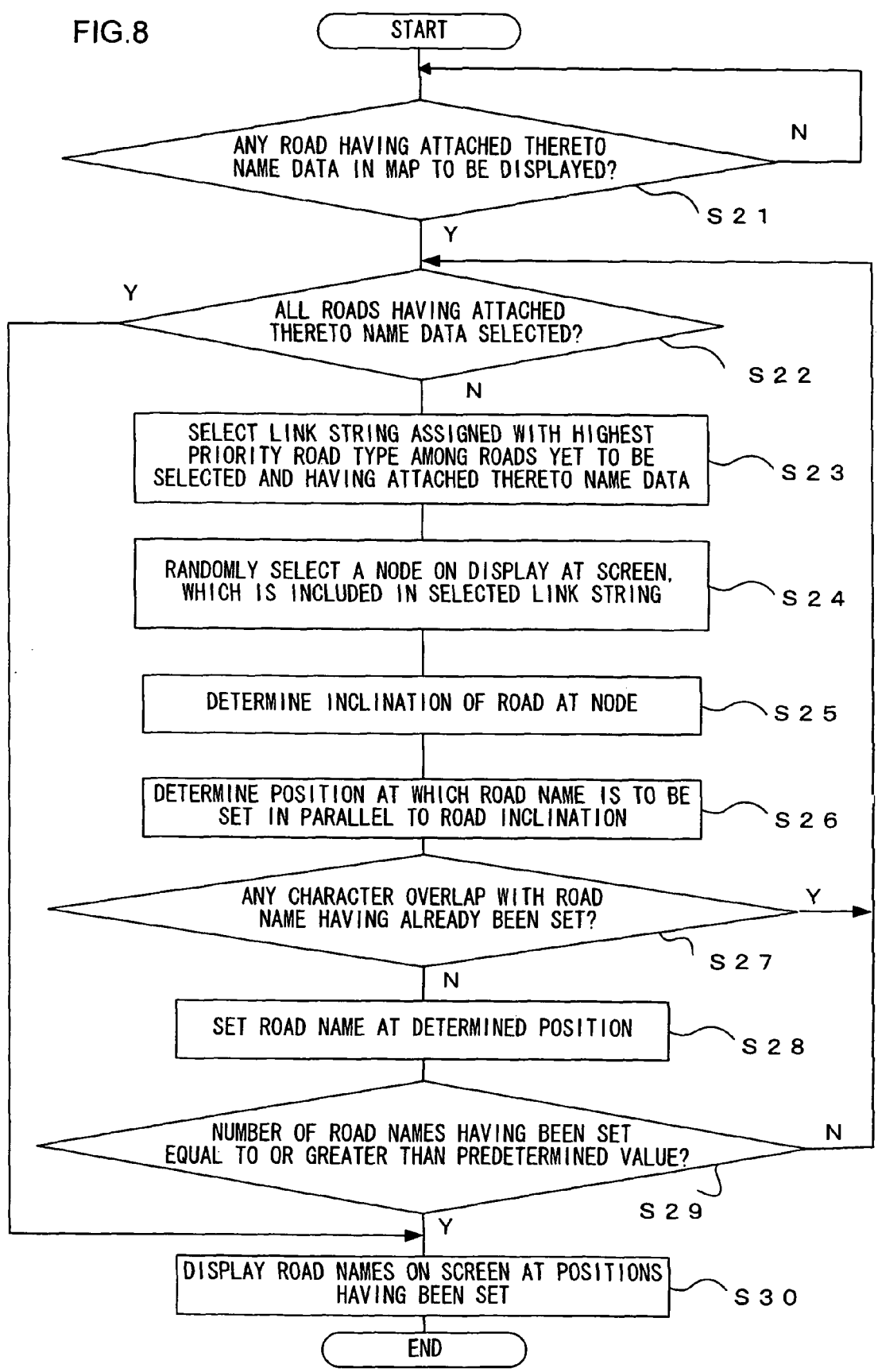
FIG. 8 presents a flowchart of the processing executed to determine the display positions for the name data in the on-vehicle unit.

FIG. 8 shows the flow of the control implemented to determine the display positions for road name data at the on-vehicle unit 100. The control, which is implemented in conformance to a program executed in the control circuit 102, is executed when displaying a map image at the display monitor 106. In step S21, a decision is made as to whether or not the map to be displayed contains a road having attached thereto name data (any set of name data among name data 1 through name data n83 specified with the road name offset data 93). If there is such a road, the operation proceeds to the following step S22, whereas the processing in step S21 is repeatedly executed if there is no such road. In step S22, a decision is made as to whether or not all the roads having attached thereto name data have been selected. The operation proceeds to step S30 if all the roads have been selected. The operation proceeds to the following step S23 if there is still a road having attached thereto name data that has not been selected yet.

In step S23, a link string assigned with the road type with the highest priority among the yet-to-be selected roads having name data attached thereto is selected. The priority rankings of the individual link strings are set in advance based upon the road types indicated with the road type data 92, with an express highway, for instance, given a higher priority ranking than a national highway and a national highway given a higher priority ranking than a local road. In step S24, one of the nodes (the points constituting the road data, indicated with the (x, y) coordinates 94 of the points 1 through j) in the link string selected in S23, which are on display at the screen, is randomly selected.

In step S25, the inclination of the road at the position of the node selected in step S24 is determined based upon its positional relationship to adjacent nodes. In step S26, the position at which the road name (the character string expressed with the name data) is to be placed is determined so as to orient the road name parallel to the inclination of the road determined in step S25. In step S27, a decision is made as to whether or not any of the characters set at the position determined in step S26 will overlap with a road name that has already been set. If it is decided that there will be a character overlap, the operation returns to step S22, whereas the operation proceeds to step S28 if there is no character overlap. In step S28, the road name is set at the position determined in step S26.

In step S29, a decision is made as to whether or not step S28 has been executed to set a road name over a number of times equal to or greater than a predetermined value, e.g., a value determined in advance in correspondence to the specific layer. The operation proceeds to step S30 if the number of road names having been set is determined to be equal to or greater than the predetermined value, whereas the operation returns to step S22 if the number of road names having been set is not equal to or greater than the predetermined value. Namely, while characters tend to overlap readily in a wide area map display with a low map scaling factor, such an overlap of characters on the screen can be prevented by decreasing the predetermined value as the map range becomes wider so as to assure an easy-to-read map display. In step S30, all the road names set in step S28 are displayed at the respective positions on the screen, before the processing ends. The road names are thus displayed at the screen.

The following advantages are achieved in the map information distribution system achieved in the embodiment described above.

(1) When the destination is entered at the on-vehicle unit and the map data around the route searched at the information distribution center are transmitted to the on-vehicle unit, assuming a data structure having sets of integrated name data each corresponding to a given road or a given background object contained in the map data in different layers and different meshes. Upon receiving the integrated name data together with the road data, the on-vehicle unit determines the positions at which the names of the roads, the background objects and the like are to be displayed based upon the integrated name data. As a result, the volume of data transmitted from the map distribution center to the on-vehicle unit is reduced, achieving reductions in the length of communication time and the communication cost.

(2) In a map data distribution method for distributing map data obtained by extracting road data and background data contained in an area ranging over a predetermined width along the recommended route as described above, in particular, minimizing the volume of data being distributed is a prerequisite, and thus, the advantage of reducing the data volume by integrating the name data is even more significant.

It is to be noted that the name data may be integrated over different layers alone or over different meshes alone. The procedure through which name data are attached to individual roads at the receiving terminal is not limited to the example shown in FIG. 8. In addition, as long as integrated name data are generated, with each set of name data in correspondence to a given road or a given background object, over different layers or different meshes, the structure of the distribution map data is not limited to the structural example presented in FIG. 7. While an explanation is given above on a method for distributing map data obtained by extracting road data and background data contained in an area ranging over a predetermined width along the recommended route (a data distribution method referred to as the dog bone method, the fishbone method or the like), the present invention may also be adopted in any of various types of map data other than such distribution map data to reduce the data volume. For instance, the present invention may be adopted when transmitting a map over a plurality of area blocks specified by the user instead of area blocks through which the recommended route passes.

Figure 9:
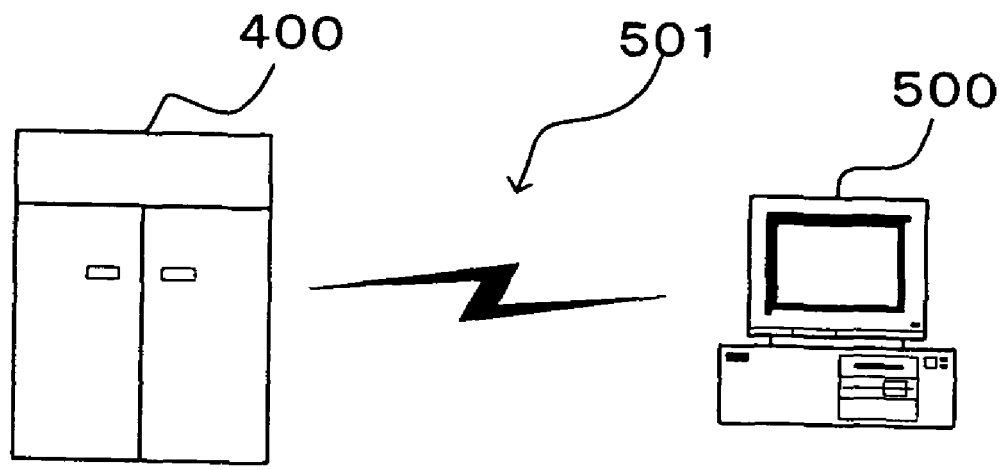
FIG. 9 shows how the present invention may be adopted in conjunction with a personal computer.

Furthermore, the distribution map data described above may be provided as data signals on the Internet or the like by adopting the present invention in conjunction with a personal computer or the like. FIG. 9 shows how this may be achieved. A personal computer 500, which can be connected with a communication line 501, is provided with the distribution map data from the information distribution center 400. The information distribution center 400 has functions similar to those of the information distribution center explained earlier in reference to FIG. 3. The communication line 501 may be a communication line for Internet communication, personal computer communication or the like, or it may be a dedicated communication line. Upon receiving a route search request from the personal computer via the communication line 501, the information distribution center 400 transmits the distribution map data related to the route to the personal computer 500. Namely, the distribution map data are converted to a signal on a carrier wave that carries a transmission medium and the signal resulting from the conversion is transmitted via the communication line 501. In short, the distribution map data can be distributed as a computer-readable computer program product adopting any of various modes.

The embodiment described above simply represents an example, and the present invention is not limited to the embodiment as long as the features characterizing the present invention are not compromised.

The invention claimed is:

1. A computer readable storage medium having stored therein distribution map data used to distribute a map through communication, the distribution map data comprising:

road data in correspondence to each of a plurality of map area blocks, the map area blocks ranging over individual areas of the map which are equal to one another in size, wherein the road data provides position information indicating positions of roads within the map area blocks; and integrated name data that provides common name information for a road, such that the integrated name data provides a single set of name data for the road for use in all of the map area blocks in which the road is present, wherein:

the distribution map data includes the road data in each of a plurality of map layers set in correspondence to different specific scaling factors, each of the scaling factors having been set in accordance with ratios of distances between points as represented on the corresponding map layer and the actual distances between the points; and the integrated name data provides the common name information such that the integrated name data provides the single set of name data in the plurality of the map layers.

2. A distribution map data generating method for generating distribution map data used to distribute a map through communication, comprising:

extracting road data and name data over map area blocks, the map area blocks ranging over individual areas of the map which are equal to one another in size so as to indicate a route passing through the map area blocks, from road map data that provides position information indicating positions of roads in each of the map area blocks and that provides name information indicating names of the roads in each of the map area blocks;

generating integrated name data by integrating name information for a road in the extracted name data, so as to provide common name information for the road such that the integrated name data provides a single set of name data for the road for use in all of the map area blocks through which the route passes; and generating the distribution map data by using the extracted road data and the integrated name data.

3. A distribution map data generating method according to claim 2, wherein:

the distribution map data includes the road data in each of a plurality of map layers set in correspondence to different specific scaling factors, each of the scaling factors having been set in accordance with ratios of distances between points as represented on the corresponding map layer and the actual distances between the points; and the integrated name data provides the common name information such that the integrated name data provides the single set of name data in the plurality of the map layers.

4. A distribution map data generating method according to claim 3, wherein:

the route passing through the map area blocks is determined as a road from a start point to an end point based upon the road data; and when extracting the road data and the name data indicating the route, road data and name data contained in an area ranging over a predetermined width along the route are extracted based upon the road map data.

5. A distribution map data generating method according to claim 2 wherein:

the route passing through the map area blocks is determined as a road from a start point to an end point based upon the road data; and when extracting the road data and the name data indicating the route, road data and name data contained in an area ranging over a predetermined width along the route are extracted based upon the road map data.

6. A distribution map data generating apparatus that generates distribution map data used to distribute a map through communication, comprising:

a storage device that stores road map data that provides position information and name information, the position information indicating positions of roads in each of map area blocks, the map area blocks ranging over individual areas of the map which are equal to one another in size, and the name information indicating names of the roads in each of the map area blocks;

an extraction device that extracts road data and name data over the map area blocks to indicate a route passing through the map area blocks based upon the road map data;

an integrating device that generates integrated name data by integrating name information for a road in the name data extracted by the extraction device so as to provide common name information for the road, such that the integrated name data provides a single set of name data for the road for use in all of the map area blocks through which the route passes; and a generating device that generates the distribution map data by using the road data extracted by the extraction device and the integrated name data.

7. A distribution data generating apparatus according to claim 6, wherein:

the distribution map data includes the road data in each of a plurality of map layers set in correspondence to different specific scaling factors, each of the scaling factors having been set in accordance with ratios of distances between points as represented on the corresponding map layer and the actual distances between the points; and the integrated name data provides the common name information such that the integrated name data provides the single set of name data in the plurality of the map layers.

8. A distribution map data generating apparatus according to claim 7, wherein:

the route passing through the map area blocks is determined as a road from a start point to an end point based upon the road data; and when extracting the road data and the name data indicating the route, the extraction device extracts road data and name data contained in an area ranging over a predetermined width along the route based upon the road map data.

9. A terminal device that displays a map by using distribution map data including road data and integrated name data to indicate a route passing through map area blocks, the integrated name data providing common name information for a road such that the integrated name data provides a single set of name data for the road for use among the map area blocks, the distribution map data having been, generated at a distribution map data generating apparatus according to claim 8, comprising:

a reception device that receives the distribution map data transmitted from an external source; and a display device that displays the route on a monitor based upon the road data in the received distribution map data and that displays names of roads on the route based upon the integrated name data in the received distribution map data.

10. A terminal device according to claim 9, further comprising:

a first position determining device that determines display positions at which the names of the roads on the route are displayed by the display device based upon road types of the roads on the route.

11. A terminal device that displays a map by using distribution map data including road data and integrated name data to indicate a route passing through map area blocks, the integrated name data providing common name information for a road such that the integrated name data provides a single set of name data for use among the map area blocks, the distribution data having been generated at a distribution map data generating apparatus according to claim 7, comprising:

a reception device that receives the distribution map data transmitted from an external source; and a display device that displays the route on a monitor based upon the road data in the received distribution map data and that displays names of roads on the route based upon the integrated name data in the received distribution map data.

12. A terminal device according to claim 11, further comprising:
a first position determining device that determines display positions at which the names of the roads on the route are displayed by the display device based upon road types of the roads on the route.

13. A distribution map data generating apparatus according to claim 6, wherein:
the route passing through the map area blocks is determined as a road from a start point to an end point based upon the road data; and
when extracting the road data and the name data indicating the route, the extraction device extracts road data and name data contained in an area ranging over a predetermined width along the route based upon the road map data.

14. A terminal device that displays a map by using distribution map data including road data and integrated name data to indicate a route passing through map area blocks, the integrated name data providing common name information for a road such that the integrated name data provides a single set of name data for the road for use among the map area blocks, the distribution map data having been generated at a distribution map data generating apparatus according to claim 13, comprising:
a reception device that receives the distribution map data transmitted from an external source; and
a display device that displays the route on a monitor based upon the road data in the received distribution map data and that displays names of roads on the route based upon the integrated name data in the received distribution map data.

15. A terminal device according to claim 14, further comprising:
a first position determining device that determines display positions at which the names of the roads on the route are displayed by the display device based upon road types of the roads on the route.

16. A terminal device that displays a map by using distribution map data including the road data and integrated name data to indicate a route passing through map area blocks, the integrated name data providing common name information for a road such that the integrated name data provides a single set of name data for the road in the map area blocks, the distribution map data having been generated at a distribution map data generating apparatus according to claim 6, comprising:
a reception device that receives the distribution map data transmitted from an external source; and
a display device that displays the route on a monitor based upon the road data in the received distribution map data and that displays names of roads on the route based upon the integrated name data in the received distribution map data.

17. A terminal device according to claim 16, further comprising:
a first position determining device that determines display positions at which the names of the roads on the route are displayed by the display device based upon road types of the roads on the route.

18. A terminal device according to claim 17, further comprising:
a second position determining device that determines display positions at which the names of the roads on the route are displayed by the display device so as to orient the names of the roads on the route to be parallel to inclinations of the route.

19. A terminal device according to claim 16, further comprising:
a second position determining device that determines display positions at which the names of the roads on the route are displayed by the display device so as to orient the names of the roads on the route to be parallel to inclinations of the route.

* * * * *